United States Patent
Edmonds et al.

(10) Patent No.: US 7,174,084 B2
(45) Date of Patent: Feb. 6, 2007

(54) METHOD AND APPARATUS FOR PERFORMING SUB-PICTURE LEVEL SPLICING BASED ON INTERRUPTS

(75) Inventors: Jeremy S. Edmonds, Redwood City, CA (US); John P. Comito, Redwood City, CA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 1273 days.

(21) Appl. No.: 09/805,492

(22) Filed: Mar. 13, 2001
(Under 37 CFR 1.47)

(65) Prior Publication Data

US 2002/0057288 A1 May 16, 2002

Related U.S. Application Data

(60) Provisional application No. 60/189,196, filed on Mar. 14, 2000.

(51) Int. Cl.
*H04N 5/93* (2006.01)
(52) U.S. Cl. .............................. 386/55; 386/52; 386/53
(58) Field of Classification Search ................ 386/55, 386/52, 53, 46, 54, 92, 95, 1, 4; 360/13, 360/32
See application file for complete search history.

(56) References Cited

U.S. PATENT DOCUMENTS

| 5,377,051 | A | * | 12/1994 | Lane et al. | .................... 386/81 |
| 6,137,834 | A | * | 10/2000 | Wine et al. | .................. 375/240 |
| 6,651,252 | B1 | * | 11/2003 | Gordon et al. | ................. 725/54 |
| 2004/0218093 | A1 | * | 11/2004 | Radha et al. | ............. 348/384.1 |
| 2004/0261104 | A1 | * | 12/2004 | Gordon et al. | ................. 725/39 |

* cited by examiner

*Primary Examiner*—Robert Chevalier
(74) *Attorney, Agent, or Firm*—Patterson & Sheridan, LLP

(57) ABSTRACT

Techniques to effectuate splicing at sub-picture level. In one aspect, splicing is effectuated via an interrupt generated after each splice has occurred. The interrupt may be generated by either the hardware designated to perform splicing or other peripheral hardware. The interrupt may be provided to a controller, which then performs the necessary processing to effectuate the next splice (e.g., load a new PID value for the next splice into the hardware register). The interrupts required for splicing may be generated in various manners, and typically depends on the specific design of the splicing and/or peripheral hardware. In one simple design, the splicing hardware generates an interrupt after each splice. Other mechanisms may also be used to generate the interrupt. For example, (e.g., scrambled audio) packets may be inserted into a transport stream and used to cause the hardware to generate an interrupt each time the packet is detected.

11 Claims, 7 Drawing Sheets

METHOD AND APPARATUS FOR PERFORMING SUB-PICTURE LEVEL SPLICING BASED ON INTERRUPTS

BACKGROUND OF THE INVENTION

The present invention generally relates to communication systems. More specifically, the invention relates to techniques to perform sub-picture level splicing based on interrupts.

Over the past few years, the television industry has seen a transformation in a variety of techniques by which its programming is distributed to consumers. Cable television systems are doubling or even tripling system bandwidth with the migration to hybrid fiber coax (HFC) cable plant. Direct broadcast satellite (DBS) systems have also emerged as a viable alternative to customers unwilling to subscribe to local cable systems. A variety of other approaches have also been attempted, which focus primarily on high bandwidth digital technologies, intelligent two-way set top terminals, or other methods to try to offer services differentiated from those of standard cable and over-the-air broadcast systems.

With the increase in bandwidth, the number of programming choices has also increased. Leveraging off the availability of more intelligent set top terminals (STTs), several companies have developed elaborate systems for providing an interactive listing of a vast array of channel offerings, expanded textual information about individual programs, and the ability to look forward as much as several weeks in advance to plan television viewing.

Unfortunately, the existing program guides have several drawbacks. First, these guides tend to require a significant amount of memory at the set top terminal. Second, the terminals may be very slow to acquire the current database of programming information when they are turned on for the first time or are subsequently restarted (e.g., a large database may be downloaded to a terminal using only a vertical blanking interval (VBI) data insertion technique). Such slow database acquisition may disadvantageously result in out of date information or, in the case of services such as pay-per-view (PPV) or video-on-demand (VOD), limited scheduling flexibility for the information provider. Third, the user interface of existing program guides do not usually look like a typical television control interface; rather the user interface looks like a 1980's style computer display (i.e., having blocky, ill-formed text and/or graphics).

An improved interactive program guide (IPG) system has been developed, which partitions guide pages into a number of regions, each of which may be individually encoded as slices and transmitted via a respective packet identifier (PID). This encoding scheme reduces the amount of redundant data transmitted for the guide pages. At the terminal, slices for the various regions are recombined (i.e., spliced) to form the desired guide page. Because a number of splices may be performed for a picture of a guide page, techniques that facilitate and improve the splicing process are highly desirable.

SUMMARY OF THE INVENTION

The invention provides techniques to effectuate splicing at sub-picture level. In one aspect, splicing is effectuated via an interrupt generated after each splice has occurred. The interrupt may be generated by either the hardware designated to perform splicing or other peripheral hardware. The interrupt may be provided to a controller, which then performs the necessary processing to effectuate the next splice (e.g., load a new PID value for the next splice into the hardware register). This interrupt driven splicing scheme eliminates the need for cycle-intensive polling of the splicing hardware to determine whether or not a splice has been performed.

The interrupts required for splicing may be generated in various manners, and typically depends on the specific design of the splicing and/or peripheral hardware. In one simple design, the splicing hardware generates an interrupt after each splice. And if the splicing hardware does not generate an interrupt after each splice, other mechanisms may also be used to generate the interrupt. For example, (e.g., scrambled audio) packets may be inserted into a transport stream and used to cause the hardware to generate an interrupt each time the packet is detected.

The invention provides various methods and system elements that implement various aspects, embodiments, and features of the invention, as described in further detail below.

The foregoing, together with other aspects of this invention, will become more apparent when referring to the following specification, claims, and accompanying drawings.

BRIEF DESCRIPTION OF THE DRAWINGS

The teachings of the invention can be readily understood by considering the following detailed description in conjunction with the accompanying drawings.

To facilitate understanding, identical reference numerals have been used, where possible, to designate identical elements that are common within a figure.

DESCRIPTION OF THE SPECIFIC EMBODIMENTS

A. System

Figure 1:
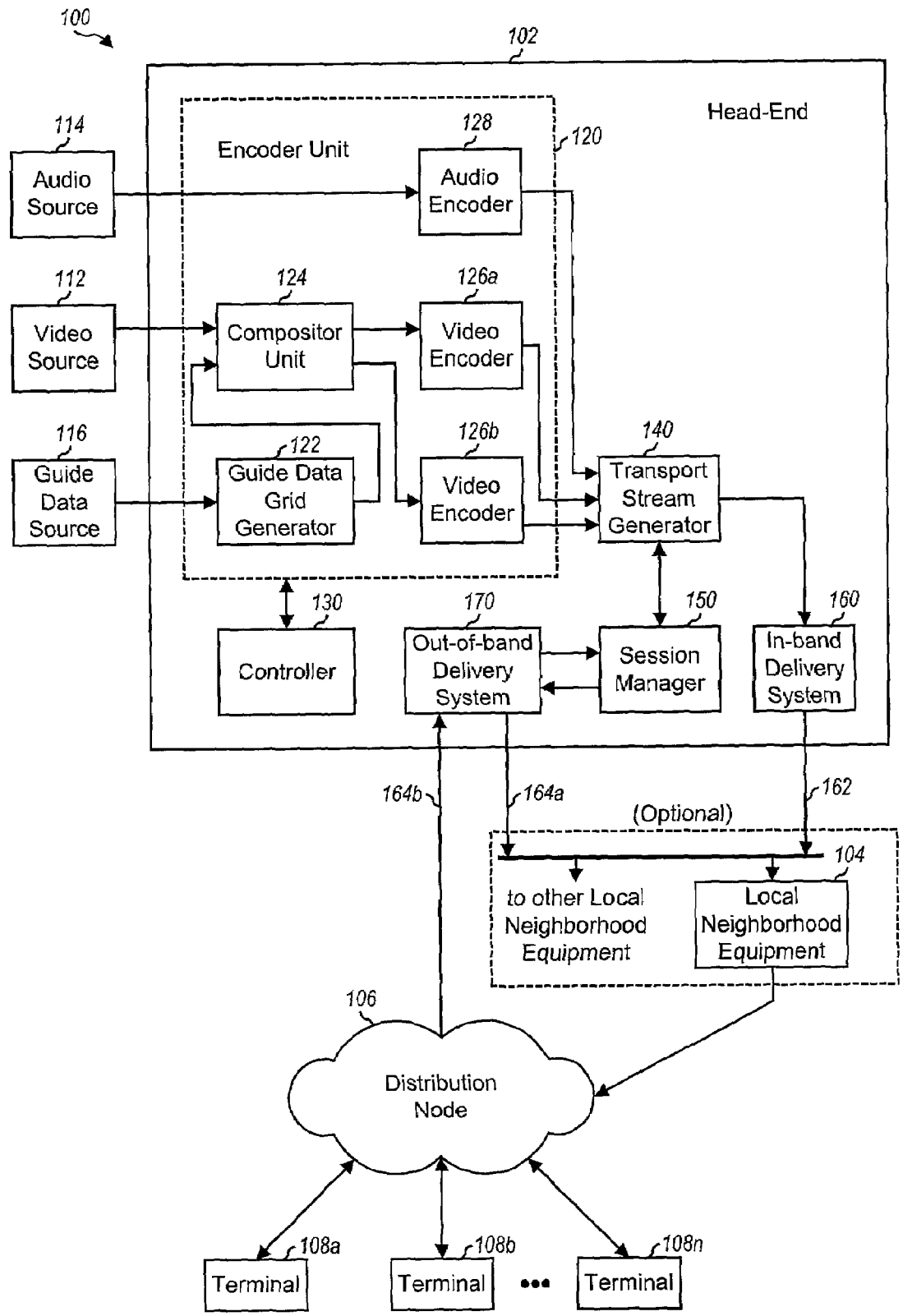
FIG. 1 is a block diagram of an embodiment of an information distribution system that can be used to provide interactive program guide (IPG) and is capable of implementing various aspects of the invention.

FIG. 1 is a block diagram of an embodiment of an information distribution system 100 that can be used to provide interactive program guide (IPG) and is capable of implementing various aspects of the invention. Distribution system 100 includes a head-end 102, (optional) local neighborhood equipment (LNE) 104, one or more distribution nodes 106 (e.g., a hybrid fiber-coax network), and a number of terminals 108 (e.g., set top terminals). Each LNE 104 may serve one or more distribution nodes 106, and each distribution node 106 is typically associated with a respective neighborhood that includes a number of terminals 108.

Head-end 102 produces a number of digital streams that contain encoded information in (e.g., MPEG-2) compressed format. These digital streams are then modulated using a modulation technique that is compatible with a communication channel 162 that couples head-end 102 to LNE 104 and/or distribution node 106.

In distribution system 100, program streams may be continually transmitted from the head-end to the terminals (i.e., broadcast) or may be addressed to particular terminals that requested the information via an interactive menu (referred to herein as "demand-cast"). An interactive menu structure suitable for requesting video-on-demand (VOD) is disclosed in U.S. patent application Ser. No. 08/984,427, entitled "METHOD AND APPARATUS FOR PROVIDING A MENU STRUCTURE FOR AN INTERACTIVE INFORMATION DISTRIBUTION SYSTEM," filed Dec. 3, 1997. Another example of an interactive menu suitable for requesting multimedia services is an interactive program guide disclosed in U.S. patent application Ser. No. 09/293,526, entitled "DATA STRUCTURE AND METHODS FOR PROVIDING AN INTERACTIVE PROGRAM GUIDE," filed Apr. 15, 1999. These applications are assigned to the assignee of the present application and incorporated herein by reference.

Figure 2:
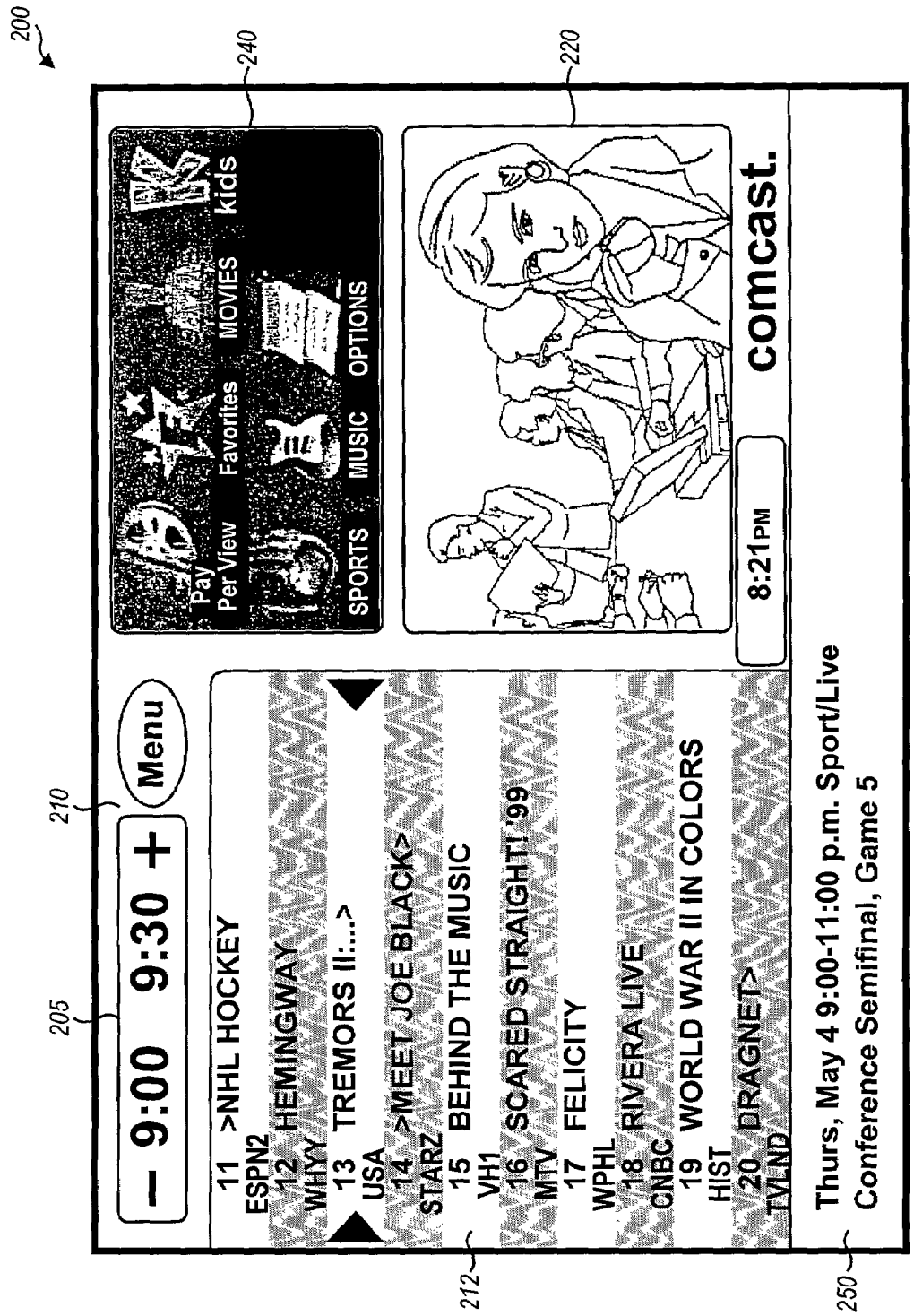
FIG. 2 is a diagram of a specific design of an IPG page used to present a program listing and other information to viewers.

To assist a viewer to select programming, head-end 102 produces information that can be assembled to create an "IPG page" such as that shown in FIG. 2. Head-end 102 produces the components of the IPG page as bitstreams that are compressed prior to transmission. Terminals 108 thereafter receive and demodulate the transmission from head-end 102, and further decode and recombine the compressed bitsteams to form the IPG pages.

Within distribution system 100, a video source 112 supplies one or more video sequences for a video portion of the IPG pages (also referred to herein as "barker" videos), an audio source 114 supplies one or more audio signals associated with the video sequences, and a guide data source 116 provides program guide data for a guide portion of the IPG pages. The guide data is typically stored and provided in a particular (e.g., text) format, with each guide entry describing a particular program by its title, presentation time, presentation date, descriptive information, channel, and program source. The video sequences, audio signals, and program guide data are provided to an encoder unit 120 within head-end 102.

Encoder unit 120 (which is described in further detail below) compresses the received video sequences into one or more elementary streams, the audio signals into one or more elementary streams, and the guide videos produced from the guide data into one or more elementary streams. The elementary streams can be produced using a number of encoding techniques such as, for example, "picture-based" encoding, "slice-based" encoding, "temporal slice persistence" (TSP) encoding, "strobecast", as well as other types of encoding, or a combination thereof.

Picture-based encoding is described in detail in U.S. patent application Ser. No. 09/384,394, entitled "METHOD AND APPARATUS FOR COMPRESSING VIDEO SEQUENCES," filed Aug. 27, 1999. Slice-based encoding is described in detail in U.S. patent application Ser. No. 09/428,066, entitled "METHOD AND APPARATUS FOR TRANSMITTING VIDEO AND GRAPHICS IN COMPRESSED FORM," filed Oct. 27, 1999. Temporal slice persistence encoding is described in detail in U.S. patent application Ser. No. 09/686,739, entitled "TEMPORAL SLICE PERSISTENCE METHOD AND APPARATUS FOR DELIVERY OF INTERACTIVE PROGRAM GUIDE," filed Oct. 10, 2000. Strobecast encoding and delivery is described in detail in U.S. patent application Ser. No. 09/687,662, entitled "EFFICIENT DELIVERY OF INTERACTIVE PROGRAM GUIDE USING DEMAND-CAST," filed Oct. 12, 2000. These applications are assigned to the assignee of the invention and incorporated herein by reference.

In the specific embodiment shown in FIG. 1, encoder unit 120 includes a guide data grid generator 122, a compositor unit 124, video encoders 126a and 126b, and an audio encoder 128. Additional video and/or audio encoders may also be included within encoder unit 120, depending on the particular head-end design. Guide data grid generator 122 receives and formats the guide data into a "guide grid", e.g., guide grid region 212 in FIG. 2.

Compositor unit 124 receives and combines the guide grid from grid generator 122 and a video sequence from video source 112, and may further insert advertising video, advertiser or service provider logos, still graphics, animation, other information, or a combination thereof. In an embodiment, compositor unit 124 provides a background video to a first video encoder 126a and a guide video (e.g., as shown in FIG. 2C) to a second video encoder 126b. For picture-based encoding, compositor unit 124 provides a composed video (e.g., as shown in FIG. 2) to one video encoder. A number of encoders can be used to encode, in parallel, a number of composed videos for a number of IPG pages, with each IPG page including different guide content.

In an embodiment, video encoder 126a is a real-time (e.g., MPEG-2) encoder that encodes the background video using a particular encoding technique, and provides one or more (e.g., MPEG-2 compliant) bitstreams for the background portion of the IPG page. In an embodiment, video encoder 126b is a (e.g., software-based) encoder that encodes the guide video using a particular encoding technique, and provides one or more bitstreams that collectively represent all or a portion of the guide grid. Each video encoder 126 is designed to efficiently and effectively encode the respective input video, and may be operated in accordance with slice-based, picture-based, temporal slice persistence, or some other encoding technique. Audio encoder 128 (e.g., an AC-3 encoder) receives and encodes the audio signals to form a bitstream for the audio signals. The video and audio encoders provide a number of elementary streams containing (e.g., picture-based or slice-based) encoded video and audio information.

For some applications such as picture-in-picture (PIP) or picture-in-application (PIA), compositor unit 124 may receive a number of video sequences and form a composed video having included therein the video sequences in scaled form (i.e., reduced in size). For example, nine video sequences may be compressed and arranged into a 3×3 grid. Video encoder 126a then receives and (e.g., slice-based) encodes the composed video and produces a number of elementary streams, one stream for each video sequence. Each video sequence can thereafter be individually transmitted from the head-end and flexibly recombined with other (e.g., guide) data and/or video at the terminal (e.g., to implement PIP or PIA). PIP and PIA are described in further detail in U.S. patent application Ser. No. 09/635,508, entitled "METHOD AND APPARATUS FOR TRANSITIONING BETWEEN INTERACTIVE PROGRAM GUIDE (IPG) PAGES," filed Aug. 9, 2000, assigned to the assignee of the invention and incorporated herein by reference.

A controller 130 couples to encoder unit 120 and manages the overall encoding process such that the video encoding process is temporally and spatially synchronized with the grid encoding process. For slice-based encoding, this synchronization can be achieved by defining the slice start and stop (macroblock) locations for each slice and managing the encoding process based on the defined slices. Slices may be defined, for example, according to objects in the IPG page layout.

The encoding process generates a group of pictures (GOP) structure having "intra-coded" (I) pictures and "predicted-coded" (P and B) pictures. For slice-based encoding, the I pictures include intra-coded slices and the P and B pictures include predictive-coded slices. In an embodiment, the intra-coded slices are separated from the predictive-coded slices and transmitted from the head-end via separate packet identifiers (PIDs). Although not shown in FIG. 1, the coded slices may be stored in a storage unit. The individual slices can thereafter be retrieved from the storage unit as required for transmission from the head-end.

A transport stream generator (TSG) 140 receives and assembles the elementary streams from the video and audio encoders into one or more transport streams. Session manager 150 manages the delivery of IPG pages to terminals 108 located on one or more distribution nodes 106. An in-band delivery system 160 (e.g., a cable modem) receives and modulates the transport streams from transport stream generator 140 using a modulation format suitable for transmission over communication channel 162. These elements are described in further detail in the aforementioned U.S patent application 09/428,066.

For a server-centric distribution system, the program guide resides at the head-end and a two-way communication system, via a back channel 164, is utilized to support communication with the terminals for delivery of the program guide. Back-channel 164 can be used by the terminals to send requests and other messages to the head end, and may also be used by the head-end to send messages and certain types of data to the terminals. An out-of-band delivery system 170 facilitates the exchange of data over the back channel and forwards terminal requests to session manager 150.

Other elements within head-end 102 may also interface with out-of-band delivery system 170 to send information to terminal 108 via the out-of-band network. For example, a spotlight server that produces a spotlight user interface may interface with out-of-band delivery system 170 directly to send spotlight data to terminals 108. Off-the-shelf equipment including network controllers, modulators, and demodulators such as those provided by General Instruments Corporation can be used to implement out-of-band delivery system 170.

Distribution system 100 is described in further detail in the aforementioned U.S. patent application Ser. Nos. 09/687,662 and 09/686,739. One specific implementation of head-end 102 is known as the DIVA™ System provided by DIVA Systems Corporation.

B. Interactive Program Guide

A unique way of providing programming schedule and listing to viewers is a server-centric approach. In this approach, the complete program guide information spanning a particular time period (e.g., two weeks of programming) is generated at a head-end and sent to the terminals in a display-ready compressed video format.

FIG. 2 is a diagram of a specific design of an IPG page 200 used to present a program listing and other information to viewers. In this design, IPG page 200 includes a time slot region 205, a guide region 210, a video region 220, an icon region 240, and a program description region 250. Other designs for the IPG page with different layouts, configurations, and combinations and arrangements of regions and objects can be contemplated and are within the scope of the invention.

Time slot region 205 indicates the (e.g., half-hour) time slots for which program guide is being provided on the IPG page. Guide region 210 is used to display program listing for a group of channels (e.g., in two half-hour time slots). Guide region 210 includes a number of channel objects used to display program information for the group of channels. Program description region 250 is used to present descriptive information relating to a particular program selected from the program listing, or may be used to present other information. Icon region 240 is used to display various icons, each of which may represent a filter or a link to either another IPG page or a particular interface. Video region 220 may be used to display images, videos, text, or a combination thereof, which may be used for advertisements, previews, or other purposes.

Figure 3:
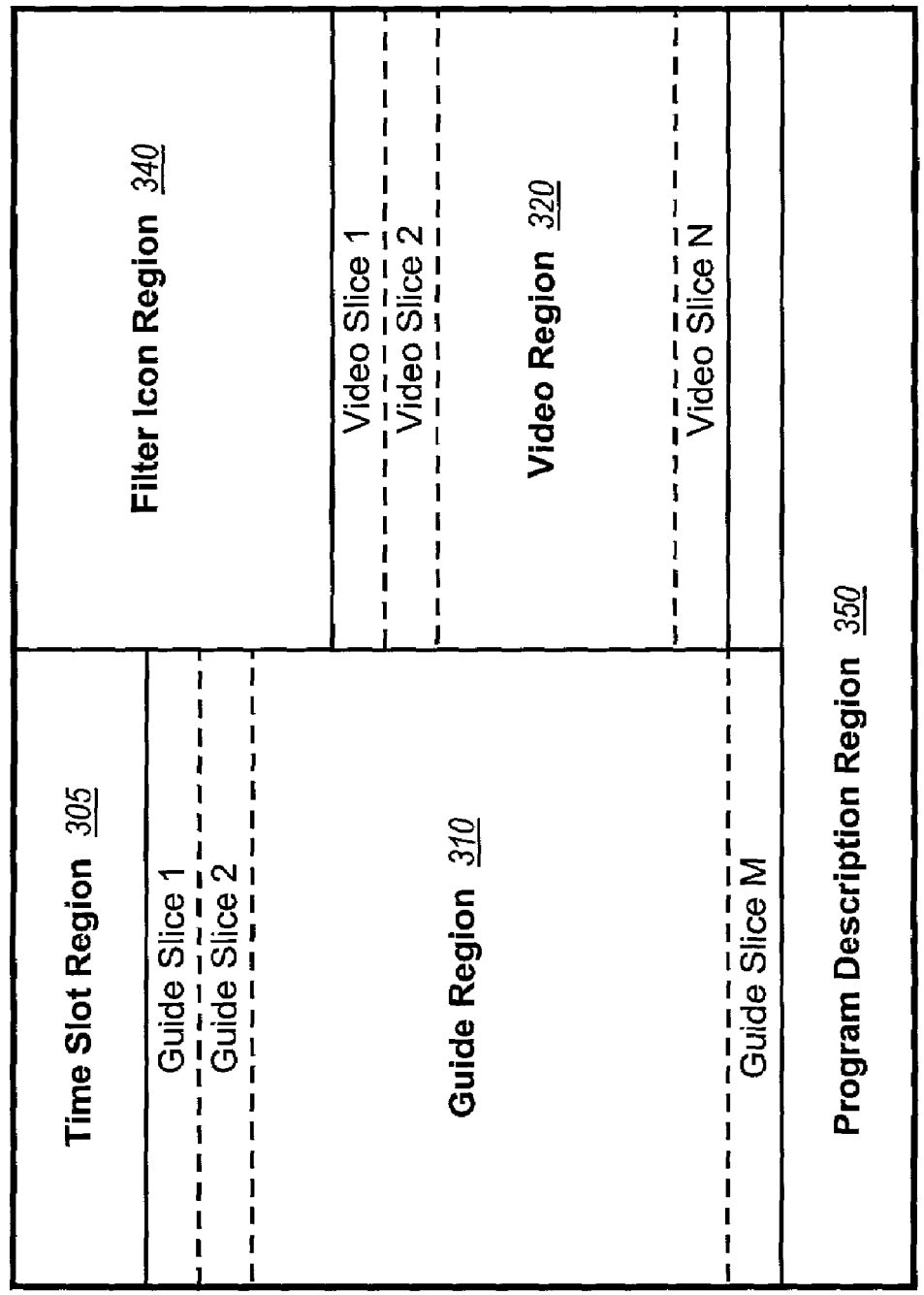
FIG. 3 is a diagram of a specific design of an IPG page that can be used to illustrate the encoding of regions of the IPG page as slices.

FIG. 3 is a diagram of a specific design of an IPG page 300 that can be used to illustrate the encoding of the regions of the IPG page as slices. As shown in FIG. 3 and described above, the IPG page can be partitioned into a number of regions including a time slot region 305, a guide region 310, a video region 320, a filter icon region 340, and a program description region 350.

As described in the aforementioned U.S. patent application Ser. No. 09/686,739, various techniques can be used to reduce the amount of data to be transmitted from the head-end to the terminals for the IPG page. For example, a video stream for video region 320 can be continually transmitted from the head-end to the terminals, guide data for guide region 310 can be transmitted continually (e.g., once for each GOP) or a limited number of times, and the data in program description region 350 can be transmitted via a data stream.

To efficiently encode and transmit the regions of the IPG page, each transmitted region can be defined with a set of slices. As shown in FIG. 3, guide region 310 can be defined with a set of M guide slices and video region 320 can be defined with a set of N video slices. Other regions may also be defined with their respective sets of slices, and arbitrary slice shapes can be defined for any region. Note however that in MPEG-2, a slice cannot be defined exceeding a macroblock row. Slice-based encoding, temporal slice persistence encoding, or strobecast encoding method can then be applied to encode and transmit the content from the head-end.

For the IPG page design shown in FIG. 2, the guide listing for each channel, which is also referred to as a channel element, can be defined as a guide slice. Each guide slice is associated with a specific location in the guide region of the page and typically includes a slice start code that identifies the start and the end of the slice. The M guide slices for the M channel elements of the guide region can be encoded (e.g., a priori) at the head-end, stored in a storage unit, and transmitted to the terminal as needed. By processing the slice start code, a decoder at the terminal is able to determine where to place the decoded slice on the IPG page, which can be used in any of the slice-based, temporal slice-persistence, and strobecast encoding methods.

C. Terminal

Figure 4:
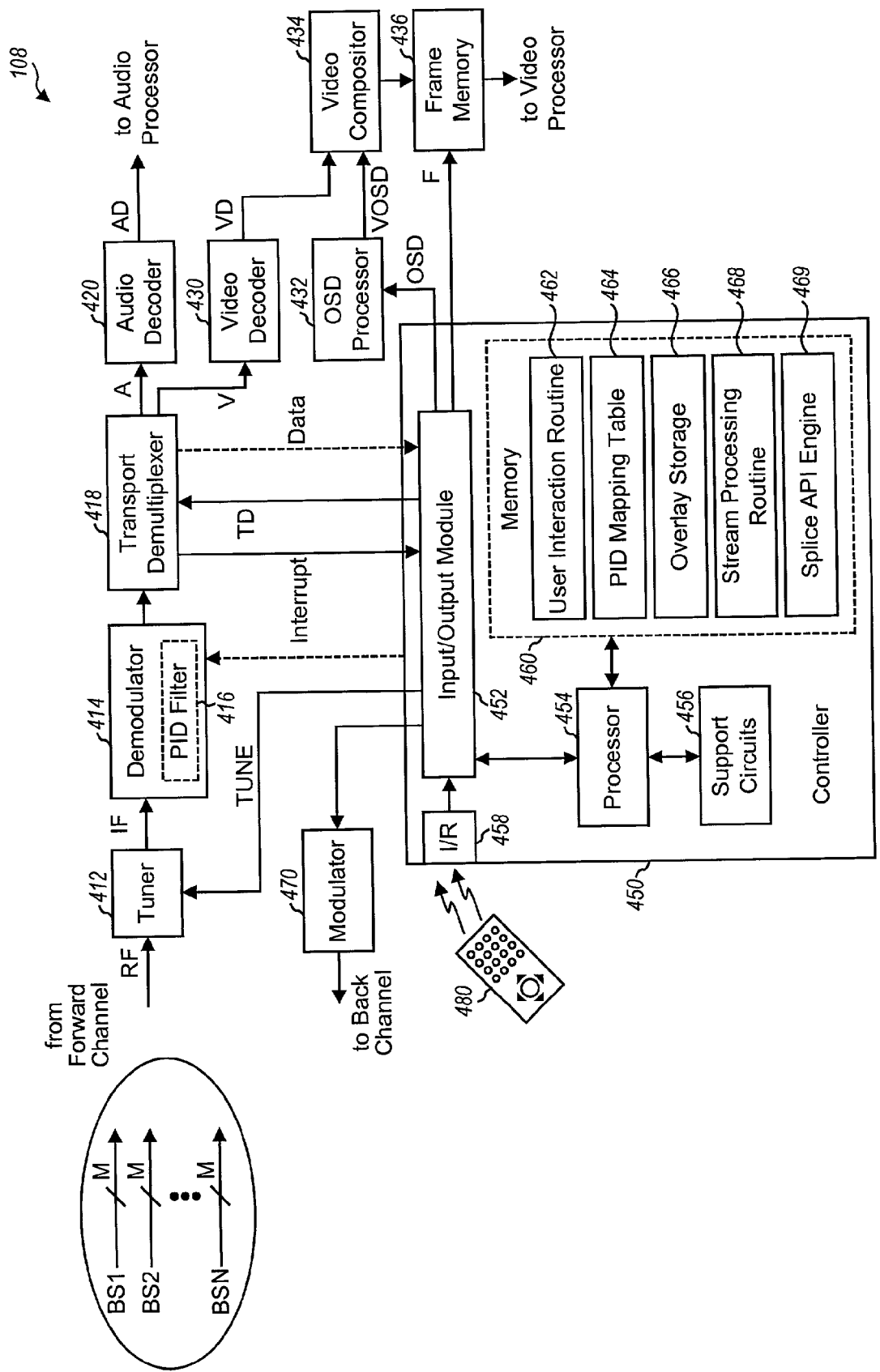
FIG. 4 is a block diagram of an embodiment of a terminal capable of providing a display for a user interface and implementing various aspects of the invention.

FIG. 4 is a block diagram of a terminal 108 (which is also referred to as a set top terminal (STT) or user terminal) capable of implementing various aspects of the invention. Terminal 108 includes a tuner 412, a demodulator 414, a transport demultiplexer (DEMUX) 418, an audio decoder 420, a video decoder 430, an on-screen display (OSD) processor 432, a video compositor 434, a frame store memory 436, a controller 450, and a modulator 470. User interaction is supported via a remote control unit 480. Tuner 412 receives an input signal comprising, for example, a number of modulated signals from a downstream (forward) channel. In response to a control signal TUNE, tuner 412 tunes to and processes a particular modulated signal to provide an intermediate signal. Demodulator 414 receives and demodulates the intermediate signal to provide an information stream (e.g., an MPEG transport stream) that is sent to transport demultiplexer 418.

Transport demultiplexer 418, in response to a control signal TD provided by controller 450, demultiplexes (i.e., extracts) an audio stream A and a video stream V. The audio stream A is provided to audio decoder 420, which decodes the audio stream and provides a decoded audio stream to an audio processor (not shown) for subsequent processing and presentation. The video stream V is provided to video decoder 430, which decodes the compressed video stream V and provides an uncompressed video stream VD to video compositor 434. OSD processor 432, in response to a control signal OSD provided by controller 450, produces a graphical overlay signal VOSD that is provided to video compositor 434.

Video compositor 434 merges the graphical overlay signal VOSD and the uncompressed video stream VD to produce a composed video stream (i.e., the underlying video images with the graphical overlay). Frame store unit 436 receives and stores the composed video stream on a frame-by-frame basis according to the frame rate of the video stream. Frame store unit 436 thereafter provides the stored video frames to a video processor (not shown) for subsequent processing and presentation on a display device. In an embodiment, during transitions between streams for a user interface, the buffers in the terminal are not reset, and the user interface seamlessly transitions from one screen to another.

Controller 450 includes an input/output (I/O) module 452, a processor 454, support circuitry 456, an infrared receiver (I/R) 458, and a memory 460. Input/output module 452 provides an interface between controller 450 and tuner 412, demodulator 414 (for some designs), transport demultiplexer 418, OSD processor 432, frame store unit 436, modulator 470, and a remote control unit 480 via infrared receiver 458.

Processor 454 interfaces with I/O module 452, support circuitry 456 (which may include power supplies, clock circuits, cache memory, and the like), and a memory 460. Processor 454 also coordinates the execution of software routines stored in memory 460 to implement the features and perform the functions supported by the terminal.

Memory 460 stores software routines that support various functions and features, and further stores data that may be used for the user interface. In the embodiment shown in FIG. 4, memory 460 includes a user interaction routine 462, a PID mapping table 464, an overlay storage 466, a stream processing routine 468, and a splice application programming interface (API) engine 469. User interaction routine 462 processes user interactions to perform various functions to provide the desired user interface menu. For example, user interaction routine 462 can implement a mask or reveal feature to display (reveal) the desired portion of the IPG page and hide (mask) the undesired portion. User interaction routine 462 may further perform various functions to achieve a demand-cast for a desired IPG page. The mask or reveal is described in U.S. patent application Ser. Nos. 09/293,526 and 08/984,427.

Stream processing routine 468 coordinates the recombination of video streams to form the desired video sequences. Stream processing routine 468 employs a variety of methods to recombine slice-based streams, some of which are described in the aforementioned U.S. patent application Ser. No. 09/686,739. In one recombination method, a PID filter 416 within demodulator 414 is utilized to filter the undesired PIDs and retrieve the desired PIDs from the transport stream. The packets to be extracted and decoded to form a particular IPG page are identified by PID mapping table 464. For most recombination methods, after stream processing routine 468 has processed the streams into the proper order, the slices are sent to video decoder 430 (e.g., an MPEG-2 decoder) to form uncompressed IPG pages suitable for display.

Although controller 450 is depicted as a general-purpose processor that may be programmed to perform specific control functions to implement various aspects of the invention, the controller may also be implemented in hardware as an application specific integrated circuit (ASIC).

Remote control unit 480 receives user manipulations via a joystick or keys on the remote control unit and transmits the manipulations to controller 450 via an infrared (IR) link or an RF link. Controller 450 is responsive to the user manipulations and executes the appropriate portion of user interaction routine 462 to process the user manipulations.

FIG. 4 shows a specific design of terminal 108. Other designs of the terminal can also be implemented to perform the functions described herein, and these alternative designs are within the scope of the invention.

D. Interrupt-Driven Splicing

The splicing of video slices with two or more different PIDs may be achieved in hardware or software, or both, and may also be performed in numerous manners. In one specific design, transport demultiplexer 418 performs splicing of video slices with different PIDs. Transport demultiplexer 418 includes a set of registers that store a current PID and a target PID for the next splice to be performed, and further includes a splice enable register that stores a value indicating whether hardware splicing is enabled or disabled.

Transport demultiplexer 418 retrieves the PID for each video packet in the transport stream and determines whether or not the PID for the retrieved packet matches the PID stored in the current PID register. If the two PIDs match, transport demultiplexer 418 forwards the packet to the next unit. If splicing is enabled, transport demultiplexer 418 further retrieves the splice countdown value in the packet and determines whether or not it is equal to zero. If the splice countdown value is equal to zero, indicating that the slice for the new PID should be spliced at this point, transport demultiplexer 418 transfers the value in the target PID register to the current PID register and further sets the target PID register to an invalid value (e.g., zero). Transport demultiplexer 418 subsequently checks the PID of the packets in the transport stream against the newly transferred PID in the current PID register. As shown in FIG. 4, the registers in transport demultiplexer 418 may be loaded via the TD control signal.

Figure 5:
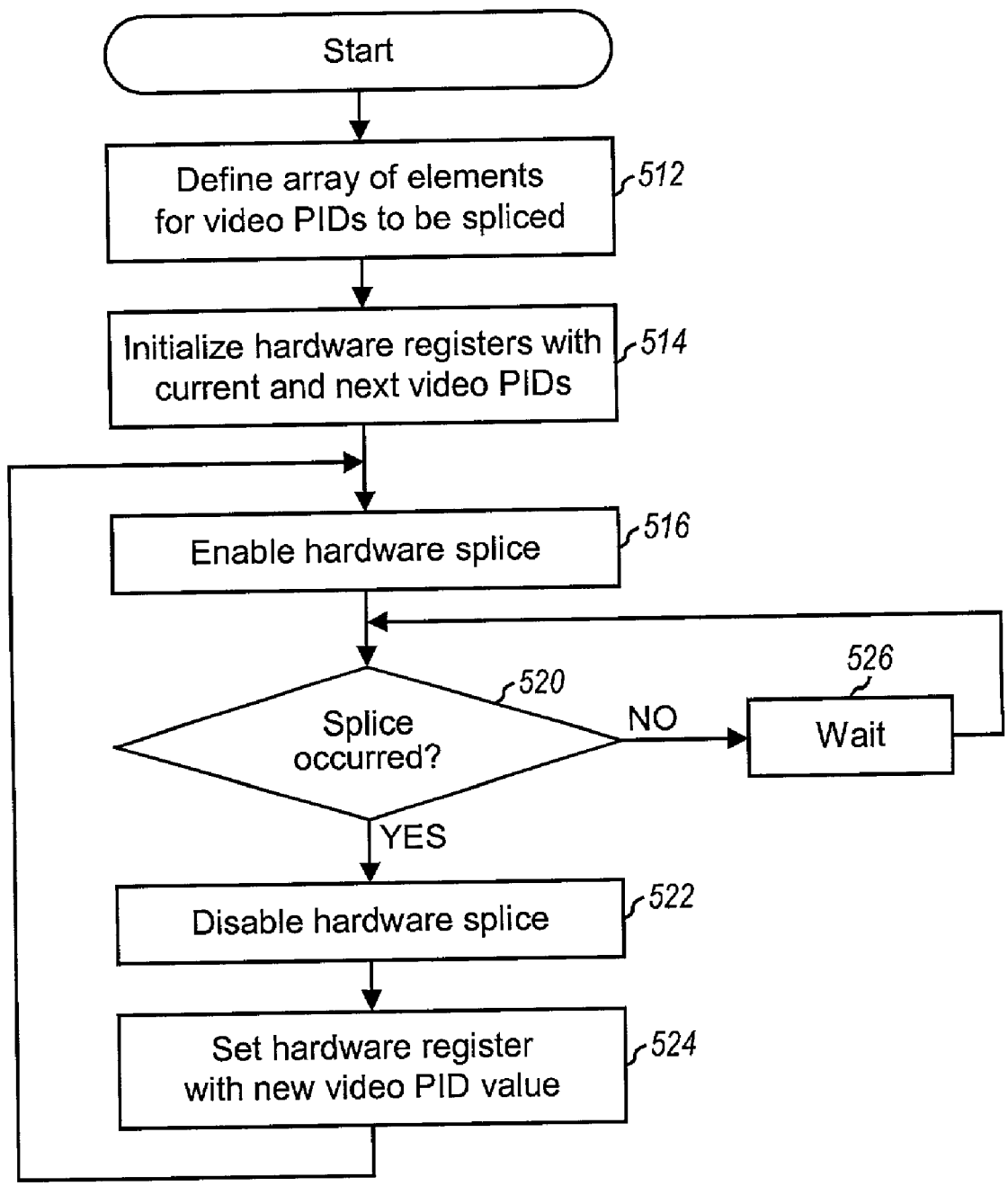
FIG. 5 is a flow diagram of an embodiment of a process for splicing together video slices with different PIDs to provide a desired IPG page.

FIG. 5 is a flow diagram of an embodiment of a process for splicing together video slices with different PIDs to provide a desired IPG page. This process is based on the hardware design for transport demultiplexer 418 described above. In an embodiment, the video and audio streams (and private data, if any) for each service are assigned to the same transport stream. Thus, after the initial acquisition of a particular service, the PCR PID identifying the particular transport stream to process does not need to be changed. However, different transport streams may also be processed using the splicing techniques described herein.

Initially, an array of elements is defined, at step 512. The array may include any number of elements (e.g., two), and each element in the array may be used to store a respective video PID to be recombined. The current PID register is then initialized with the entry in the first element of the array, and the target PID register is initialized with the entry in the second element of the array, at step 514. The hardware splice is then enabled by setting the splice enable register, at step 516.

The hardware register is then (periodically or occasionally) checked to determine whether or not a splice has occurred, at step 520. For the design described above, this may be achieved by checking the value stored in the target PID register (e.g., for an invalid value set by transport demultiplexer 418 after a splice has been performed). If a splice did occurred, the hardware splice is temporarily disabled, at step 522, and the target PID register is loaded with the next entry in the array, at step 524.

If the array includes two elements, the target PID register is loaded with the entry that is not the current video PID. In this manner, the current PID alternates between the two entries in the array. The process then returns to step 516 and the hardware splice is again re-enabled for the next splice.

And if the array includes more than two elements (e.g., between 44 and 128 elements) then, instead of alternating between two entries, the elements in the array may be traversed from element-to-element. The next element is wrapped around to the first element if the last element is reached. The use of more elements in the array allows any number of PIDs to be spliced together.

Back at step 520, if a splice has not occurred, the process waits for a particular time period, at step 526, and then returns to step 520 to recheck the (target PID) hardware register.

The process described above in FIG. 5 may be used for picture level recombination (PLR) and slice level recombination (SLR). For PLR, an entire picture is encoded and sent with one PID, and pictures are spliced together. And for SLR, a picture may be partitioned into a number of regions, and each region may be individually encoded with one or more slices and sent with a respective PID, as described above. To form the picture at the terminal, the splices for the different regions are spliced together. As an example, time slot region 305 and guide region 310 in FIG. 3 may be encoded as slices and transmitted with a first video PID, and video region 320, filter icon region 340, and program description region 350 may be also encoded as slices and transmitted with a second video PID. To form the IPG page at the terminal, the slices with the first video PID may be recombined with the slices with the second video PID.

The slice recombination based on the encoding scheme shown in FIG. 3 is performed at the sub-picture level (instead of the picture level). Using the recombination process shown in FIG. 5, an IPG application would need to poll the hardware register often to effectuate two splices for each of a number of rows in the picture. The IPG application is a high level application that may not be able to poll the hardware register often enough to catch all splices as they occur. In particular, the host central processing unit (e.g., controller 450 in FIG. 4) may not be able to poll the splicing hardware (e.g., transport demultiplexer 418) at a sufficient rate. The invention provides techniques to effectuate splicing at sub-picture level.

In accordance with an aspect of the invention, splicing is effectuated via an interrupt generated after each splice has occurred. The interrupt may be generated by either the hardware designated to perform splicing or other peripheral hardware. The interrupt is then provided to the controller, which then performs the necessary processing to effectuate the next splice. This interrupt driven splicing scheme eliminates the need for cycle-intensive hardware polling.

The interrupts required for splicing may be generated in various manners, and typically depends on the specific design of the splicing and/or peripheral hardware. In one simple design, the splicing hardware generates an interrupt after each splice. The controller receives the interrupt and thereafter performs the required processing to effectuate the next splice. If the splicing hardware does not generate an interrupt after each splice, other mechanisms may also be used to generate the interrupt. For clarity, the invention is described for a specific hardware design that generates an interrupt when an audio packet marked as scrambled is received. This hardware design is implemented in the DCT 2000 from General Instruments Corporation.

Referring back to FIG. 4, transport demultiplexer 418 issues an interrupt when it receives an audio packet marked as scrambled. Transport demultiplexer 418 also discards the scrambled audio packet and, as long as the packet does not contain valid audio data, the audio stream is unaffected. A scheme can be implemented to allow transport demultiplexer 418 to generate interrupts based on scrambled audio packets, which are then used to perform sub-picture level splicing.

Figure 6:
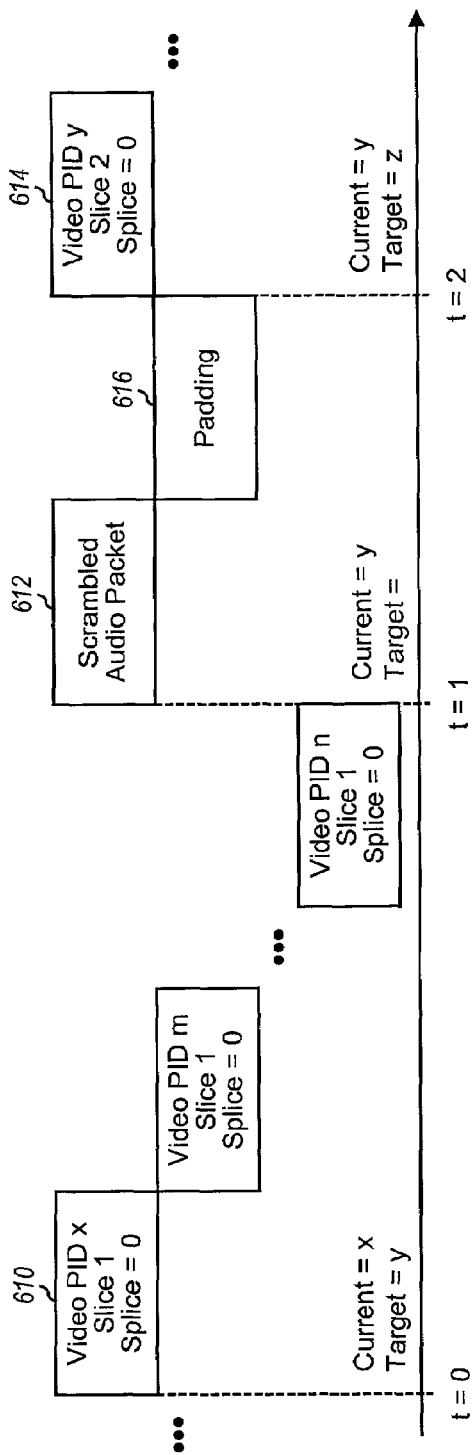
FIG. 6 is a timing diagram for a specific interrupt-driven splicing scheme of the invention.

FIG. 6 is a timing diagram for a specific interrupt-driven splicing scheme of the invention. Prior to time t=0, the current PID register is loaded with the current PID (e.g., video PID x) and the target PID register is loaded with the next PID (e.g., video PID y). At some time between t=0 and t=1, a packet 610 is received with the current PID and having a splice countdown value of zero. At this time, the current PID register is loaded with the value stored in the target PID register, and transport demultiplexer 418 begins extracting packets with the new video PID. The target PID register may be set to an invalid value, as described above.

In an embodiment, a dummy scrambled audio packet 612 is inserted into the transport stream between the last packet 610 of the "prior" current PID (e.g., video PID x) and the first packet 614 of the "new" current PID (e.g., video PID y). This scrambled audio packet 612 is used to cause transport demultiplexer 418 to generate an interrupt, which is then used by controller 450 to direct the loading of a new PID value into the target PID register.

Because of processing delay between the time scrambled audio packet 612 is detected by transport demultiplexer 418 and the time the new PID value is loaded into the target PID register, the first packet 614 for the new current PID is delayed until time t=2. In one embodiment, this delay is ensured by inserting a number of non-video packets 616 (represented as "Padding" in FIG. 6) between the triggering scrambled audio packet 612 and the first packet 614 for the new current PID. During the time interval between t=1 and t=2, the new video PID (e.g., video PID z) from the next element of the array is loaded into the target PID register. Starting at time t=2, transport demultiplexer 418 begins extracting packets with the new current PID (e.g., video PID y).

The number of packets to be inserted between the last packet 610 for the prior current PID and the first packet 614 for the new current PID is dependent on the worst case delay expected to be required to handle the interrupt. For example, if the expected worst case delay is 500 μsec, then approximately 10 packets at 27 Mbit/sec are inserted in the transport stream between times t=1 and t=2. The inserted packets may be packets for other video, audio, and data PIDs. Alternatively, null packets may also be used as padding. In general, any type of packet may be inserted, except packets for the new current PID.

Splice API engine 469 (see FIG. 4) may be implemented to supervise splicing to form the desired output pictures. Splice API engine 469 interfaces with a high-level (IPG) application and receives requests to perform splicing tasks. Splice API engine 469 then configures the hardware to perform splicing and further includes or invokes a splice interrupt service routing (ISR) to handle splice related interrupts generated by transport demultiplexer 418. The splice ISR acts as the intermediary between splice API engine 469 and the splicing hardware (e.g., transport demultiplexer 418) and converts each interrupt into a software event.

Upon receiving a ("service component splice array") request from stream processing route 468 with the array of elements having valid entries, splice API engine 469 configures the splice ISR. Splice API engine 469 further configures the registers in transport demultiplexer 418 (i.e., the splice hardware) to begin extracting packets with the PID in the first entry of the array and to splice to the PID in the second entry of the array. This may be achieved by loading the values for the first two elements in the array to the current and target PID registers in transport demultiplexer 418. Splice API engine 469 may also return an acknowledgment message to the calling application indicating no error.

When an interrupt is received from transport demultiplexer 418 indicating that a splice has occurred, splice ISR configures transport demultiplexer 418 for the next entry in the array. If the splice that just occurred corresponds to the last entry in the array, transport demultiplexer 418 is configured for the first entry in the array and the process continues in the normal manner.

When a request is received while splice API engine 469 is already in an active state, the new array of PID values is saved, and splice API engine 469 continues to use the current array of PID values in the normal manner until the end of that array is reached. At this time, the splice ISR configures the next splice for the first entry in the new array and further indicates that the old array has been freed up, which may be achieved by setting the first entry in the old array to an invalid value (e.g., zero). By monitoring the value in this array element, splice API engine 469 can detect when the array has been switched and can send a response message back to the calling application.

For the specific implementation using the DCT 2000, an Audio Encrypted Error interrupt (bit zero of the interrupt source 1 register on the BCM7010) may be used to indicate that a splice has occurred based on the inserted dummy scrambled audio packet. Tests have been performed to ensure that this interrupt has proper behavior and does not impact the normal operation and behavior of the code or interrupts on the existing platform.

The pseudo-code for the splice ISR may be as follows:

```
ISR()
{
    Set_Hardware_For_Next_Splice (video_PID [Array_Counter],
    PCR_PID) ;
    If (Array_Counter++ > Maximum_Array_Size)
    {
        If (New_Array_Available)
            Switch_To_New_Array ()
        Set_Counter_To_Zero ()
    }
}
```

The interrupt-driven splicing scheme described above may be implemented in similar manner as the flow diagram shown in FIG. 5. However, instead of polling the hardware register to determine whether or not a splice has been performed (step 520), this splice event triggers an interrupt. Thus, steps 520 and 526 in FIG. 5 may be replaced with a step for identifying whether or not the interrupt has occurred.

Referring back to FIG. 1, the dummy scrambled audio packet may be generated by audio encoder 128 and inserted in the proper location in the transport stream by transport stream generator 140 (as shown in the timing diagram in FIG. 6). Dummy padding packets, if any, may be generated by video encoder 126*a* or 126*b* or audio encoder 128. These padding packets may also be inserted in the appropriate location in the transport stream by transport stream generator 140.

The interrupt-driven splicing scheme described herein may be advantageously used for slice-level recombination (SLR) techniques, which are described in detail in the aforementioned U.S. patent application Ser. No. 09/428,066. Using SLR techniques, a large number of MPEG video streams may be sent over a given transport rate. For example, if each video stream is used to send a respective IPG page, then approximately 80 IPG pages may be sent in a 27 Mbps transport rate.

As shown in FIGS. 2 and 3, since each IPG page is decomposed into a number of regions and the contents of some or all of these regions may be sent with different video PIDs. At the terminal, SLR techniques may be used to recombine the slices for different regions, which may be sent using different video PIDs, to form the desired IPG page. A number of splices are performed for each I-picture of the selected IPG page. Fast switching of video PIDs for these different regions may be achieved using the interrupt-driven splicing scheme to load the hardware registers.

Figure 7A:
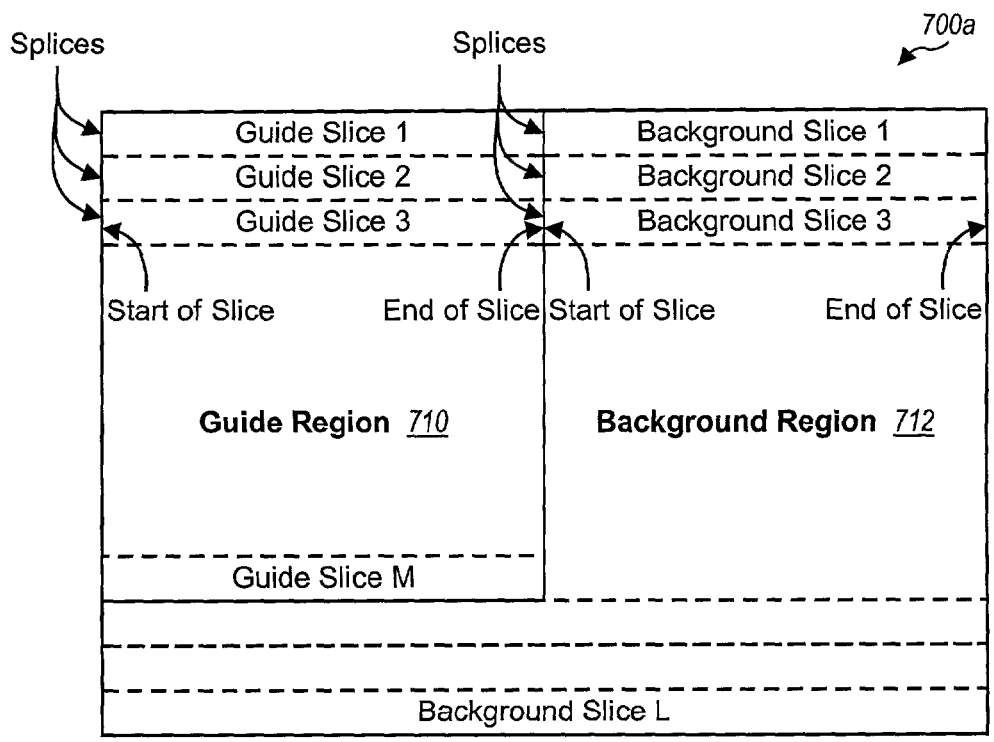
FIG. 7A is a diagram of the splices performed for an I-picture of an IPG page, in accordance with an embodiment of the invention.

FIG. 7A is a diagram of the splices performed for an I-picture of an IPG page 700*a*, in accordance with an embodiment of the invention. In this simple example, IPG page 700*a* includes a guide region 710 sent with a first video PID (e.g., PID-1) and a background region 712 sent with a second video PID (e.g., PID-2). To form the I-picture for IPG page 700*a* at the terminal, the slices in guide region 710 are recombined (i.e., spliced) with the slices in background region 712.

As shown in FIG. 7A, guide region 710 includes a number of (guide) slices, and background region 712 similarly includes a number of (background) slices. For the I-picture, there are two splices per row that includes both guide and background slices. The splice points for the first three rows are indicated in FIG. 7A.

Figure 8:
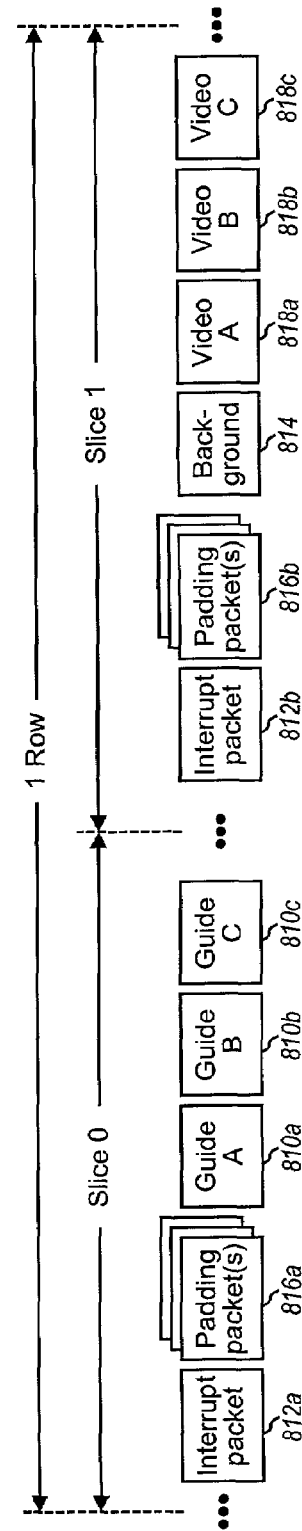
FIG. 8 is a diagram that shows the transmitted packets for a row that includes both guide and background slices, in accordance with one embodiment of the invention.

FIG. 8 is a diagram that shows the transmitted packets for a row that includes both guide and background slices, in accordance with in one embodiment of the invention. For the first splice in the row, an "interrupt" packet 812a is included in the transport stream and used to cause an interrupt, which is then used to load the hardware register in transport demultiplexer 418 with the new video PID (e.g., PID-2) for background region 712. In this example, a number of padding packets 816a are inserted after interrupt packet 812a to allow terminal 108 adequate time to process the interrupt and load the hardware register. Packets 810 for guide slices for a number of IPG pages are thereafter sent in the transport stream. Depending on the particular IPG page selected, transport demultiplexer 418 extracts the guide packets for the selected IPG page, as indicated by the PID loaded into the current PID register.

Thereafter, another "interrupt" packet 812b is included in the transport stream and used to cause an interrupt, which is then used to load the hardware register in transport demultiplexer 418 with the new video PID (e.g., PID-1) for guide region 710. Again, a number of padding packets 816b are also inserted after interrupt packet 812b to allow terminal 108 time to process the interrupt. Packets 814 for background slices for background region 712 (which are common to the IPG pages) are thereafter sent in the transport stream. Transport demultiplexer 418 then extracts the background packets, as indicated by the PID loaded in the current PID register.

A video is typically encoded as a GOP having one I-picture followed by a number of P and B pictures. In an embodiment, the guide region obtained from the I-picture is maintained during the P and B pictures in the GOP. Thus, for the guide region, only the I-picture for each GOP is decoded. If the slices for the P and B pictures for the background region are sent with one PID, then no splices need to be performed for the P and B pictures. Moreover, if the slices for the P and B pictures for the background region are sent with the same PID as that used for the I picture, then no splices needs to be performed between the I-picture and the P and B pictures.

Figure 7B:
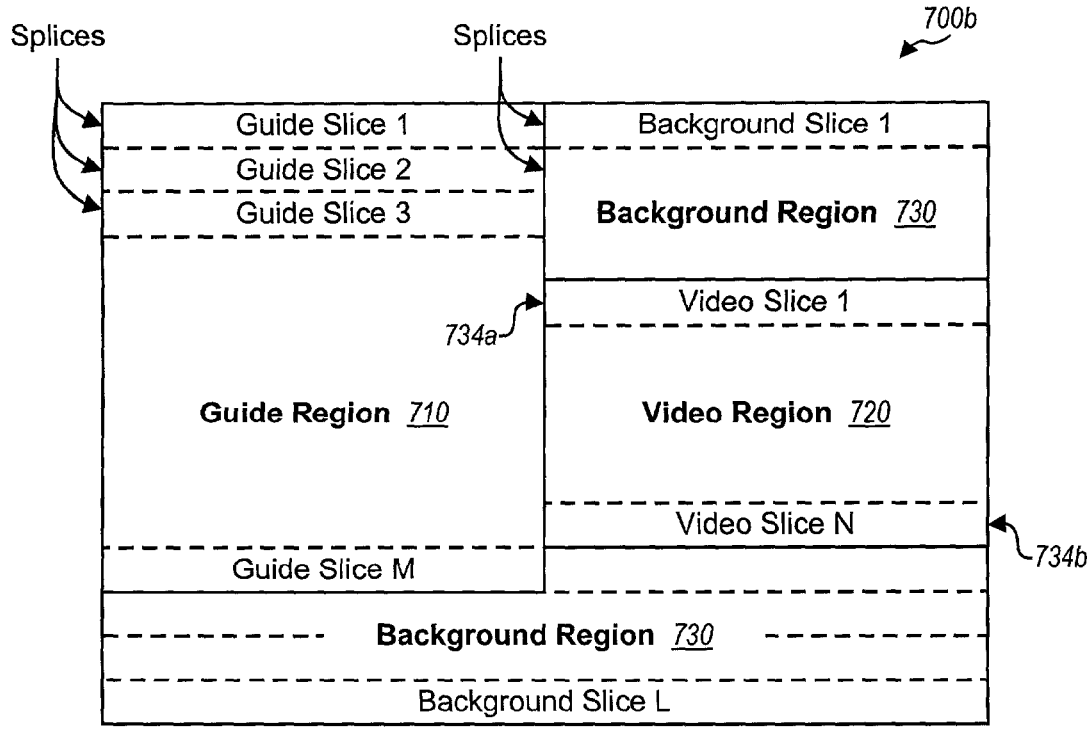
FIG. 7B is a diagram of the splices performed for an IPG page having three regions.

FIG. 7B is a diagram of the splices performed for an IPG page 700b having three regions-guide region 710, video region 720, and background region 730. This recombination scheme allows any one of a number of barker videos to be recombined in video region 720 in an IPG page (e.g., to show previews or advertisements). Guide region 710 for each IPG page maybe sent using a respective PID, each barker video suitable for display in video region 720 may also be sent using a respective PID (shown as packets 818 in FIG. 8), and background region 730 may be sent using one PID. Background region 730 may also include the slices in the area covered by video region 720, but these slices may be replaced by the slices for the selected barker video.

For the I-picture, two splices are performed for each row having slices corresponding to two different regions, similar to that described above for FIG. 7A. However, the PID to be used for the second splice in the row may correspond to the PID for background region 730 or the PID for the selected barker video in video region 720, depending on whether the background region or the video region is being spliced to the guide region.

In an embodiment, the guide region obtained from the I-picture is maintained during the P-pictures, and only the I-picture in each GOP for the guide region is decoded. In an embodiment, a group of one or more "skip macroblock" commands is provided for each guide slice not transmitted and decoded. Since a slice includes one or more macroblocks, the number of skip macroblock commands is typically dependent on the size of the slice (which may depend on the desired visual effect). The decoder recognizes these commands and skips over the guide slices on the left side of the IPG page. Alternatively, a common PID may be transmitted for the skipped guide slices during the P and B pictures.

In one embodiment, the skipped macroblock slices for the guide region are sent using one PID (which may be the same or different from the PID for the background region). For this embodiment, two splices are performed for rows having skipped macroblock and video slices. In another embodiment, the skipped macroblock slices are included with the video slices, and only two splices (at points 734a and 734b) are required for each P and B picture. Each splice may be performed based on an interrupt, as described above.

For clarity, various aspects of the invention have been specifically described for a specific implementation whereby an interrupt is generated based on a scrambled audio packet. In general, other schemes to generate the interrupt may be employed and are within the scope of the invention. For example, an interrupt may be generated by the hardware whenever a splice is performed. The interrupt may also be generated by inserting other types of packet into the transport stream, or by manipulating the transport stream in some other manner.

The techniques described herein may also be used to cause certain effects at the terminals by inserting the proper control in a transport stream (e.g., which is typically inserted at the head-end). For example, certain types of packets (e.g., scrambled audio packets or some other types of packets) may be inserted in the transport stream. These inserted packets are then used to trigger certain desired behavior or effects at the terminal. For the example described herein, splicing is just one instance of the behavior that may be triggered.

The interrupt-driven splicing techniques described herein may be advantageously used to form IPG pages having a number of regions that may be independently encoded and transmitted via different PIDs, which then requires a number of splices to be performed at the terminal to form the desired picture. The interrupt-driven splicing techniques may also be used for other video applications, and may generally be used to recombine slices associated with two or more PIDs.

The foregoing description of the preferred embodiments is provided to enable any person skilled in the art to make or use the invention. Various modifications to these embodiments will be readily apparent to those skilled in the art, and the generic principles defined herein may be applied to other embodiments without the use of the inventive faculty. Thus, the invention is not intended to be limited to the embodiments shown herein but is to be accorded the widest scope consistent with the principles and novel features disclosed herein.

What is claimed is:

1. A method for splicing video slices associated with a plurality of packet identifiers (PIDs), comprising:
loading a splicing hardware with a current PID and a target PID for an upcoming splice:
processing a transport stream for packets;
generating the interrupt in response to receiving a packet of a particular type;
receiving an interrupt indicating that a splice has been performed; and
loading a new target PID into the splicing hardware for a next splice.

2. The method of claim 1, wherein the particular type packet is specifically inserted into the transport stream to cause the interrupt.

3. The method of claim 1, wherein the particular type packet is a scrambled audio packet.

4. The method of claim 1, wherein one or more packets are included in the transport stream between the particular type packet and a first packet with the new target PID.

5. The method of claim 1, wherein one or more padding packets are inserted in the transport stream between the particular type packet and a first packet with the new target PID.

6. The method of claim 1, wherein the interrupt is generated by the splicing hardware as a result of performing the splice.

7. The method of claim 1, further comprising:
   identifying video packets in a transport stream;
   checking the PID of each video packet in the transport stream against the current PID; and
   providing the video packet if the PID of the packet matches the current PID.

8. The method of claim 1, further comprising:
   if a splice has been performed and prior to loading the new target PID into the splicing hardware, transferring the target PID as the current PID within the splicing hardware.

9. A method for splicing video slices associated with a plurality packet identifiers (PIDs), comprising:
   loading a splicing hardware with a current PID and a target PID for an upcoming splice;
   receiving an interrupt indicating that a splice has been performed; and
   loading a new target PID into the splicing hardware for a next splice;
   wherein the splicing is performed at a sub-picture level and a plurality of splices are performed for an intra-coded (I) picture;
   wherein video slices for three or more PIDs are spliced to for the 1 picture.

10. The method of claim 1, further comprising:
    defining an array with a plurality of elements; and
    setting the plurality of elements in the array with the plurality of PIDs.

11. The method of claim 10, further comprising:
    traversing the elements in the array as each splice is performed; and
    providing the PID stored in a current element as the new target PID.

* * * * *

UNITED STATES PATENT AND TRADEMARK OFFICE
CERTIFICATE OF CORRECTION

PATENT NO. : 7,174,084 B2  Page 1 of 1
APPLICATION NO. : 09/805492
DATED : February 6, 2007
INVENTOR(S) : Jeremy S. Edmonds et al.

It is certified that error appears in the above-identified patent and that said Letters Patent is hereby corrected as shown below:

Column 13, line 47, delete "maybe" and insert instead --may be--.
Column 14, line 59, in claim 1, after "splice" delete ":" and insert instead --;--.
Column 16, line 2, in claim 9, after "plurality" insert --of--; line 13, in claim 9, delete "for the 1" and insert instead --form the I--.

Signed and Sealed this

Twenty-eighth Day of August, 2007

JON W. DUDAS
*Director of the United States Patent and Trademark Office*